TIMING CIRCUIT

Filed Feb. 28, 1946 8 Sheets-Sheet 1

INVENTORS: G. H. MARMONT
B.M. OLIVER
BY William F. Simpson
ATTORNEY

Aug. 19, 1952 G. H. MARMONT ET AL 2,607,892

TIMING CIRCUIT

Filed Feb. 28, 1946 8 Sheets-Sheet 2

INVENTORS: G. H. MARMONT
B. M. OLIVER

BY William F. Simpson

ATTORNEY

INVENTORS: G. H. MARMONT
B. M. OLIVER
BY *William F. Simpson*

ATTORNEY

INVENTORS: G. H. MARMONT
B. M. OLIVER
BY William F. Simpson
ATTORNEY

Aug. 19, 1952 G. H. MARMONT ET AL 2,607,892

TIMING CIRCUIT

Filed Feb. 28, 1946 8 Sheets-Sheet 5

INVENTORS: G. H. MARMONT
B. M. OLIVER
BY William F. Simpson
ATTORNEY

INVENTORS: G. H. MARMONT
B. M. OLIVER
BY William F. Simpson
ATTORNEY

INVENTORS: G. H. MARMONT
B. M. OLIVER
BY William F. Simpson,
ATTORNEY

TIMING CIRCUIT

Filed Feb. 28, 1946 8 Sheets-Sheet 8

INVENTORS: G. H. MARMONT
B. M. OLIVER
BY

ATTORNEY

Patented Aug. 19, 1952 2,607,892

UNITED STATES PATENT OFFICE 2,607,892

TIMING CIRCUIT

George H. Marmont, Chicago, Ill., and Bernard M. Oliver, New York, N. Y., assignors to Bell Telephone Laboratories, Incorporated, New York, N. Y., a corporation of New York Application February 28, 1946, Serial No. 650,978

4 Claims. (Cl. 250—27)

This invention relates to timing and pulse generation circuits and apparatus and more particularly to circuits and apparatus for securing a plurality of pulses, the times of occurrence of each of which, relative to the others or to a fixed reference time, may be readily and accurately set and determined.

The object of this invention is to provide improved apparatus, methods and systems for generating a plurality of pulses, the times of occurrence of which, relative to a fixed or reference time or relative to the times of occurrence of various of the pulses, may be readily and accurately controlled.

Another object of the invention is to provide apparatus, methods and systems which readily permit the variation of the time of occurrence of one pulse relative to a reference pulse (or relative to other pulses) and at the same time permit the time selected for the pulses to be predetermined to a high degree of accuracy.

A feature of the invention relates to apparatus and equipment for generating a plurality of step wave forms having different time durations.

Another feature of the invention relates to apparatus and equipment for making the height of each of the steps in the output wave form of the step wave generators substantially equal.

Another feature of this invention relates to methods and apparatus for causing the wave shape of each of the steps of the various wave forms to be substantially rectangular or square.

Another feature of the invention relates to apparatus for resetting all of the pulse circuits and the initiation of their operation at predetermined intervals of time.

Another feature of the invention relates to apparatus and equipment provided for preventing the generation of, or transmission of, more than one pulse from each output circuit during any cycle of operation of the system.

Briefly, the system may be thought of as a clock that ticks once every ten microseconds in combination with means for sending out a pulse under control of any tick. Equipment is provided for selecting any desired one of the ticks to control the transmission of a desired pulse. Cyclically operable means is provided for automatically resetting the pulse transmission circuits and for transmitting a reference or zero time pulse. Means are also provided for varying the length of the cycle of operation.

The foregoing objects and features of this invention, together with other objects and features of this invention, the novel features of which are specifically set forth in the claims appended hereto, may be more readily understood from the following description when read with reference to the accompanying drawings, in which:

Fig. 1 shows in block diagram form the various elements in this invention and the manner in which they cooperate one with another;

Figs. 2, 3, 4, 5 and 6, when arranged as shown in Fig. 7, show in detail an exemplary system embodying the present invention;

Fig. 7 shows the manner in which

Figures 1, 7:
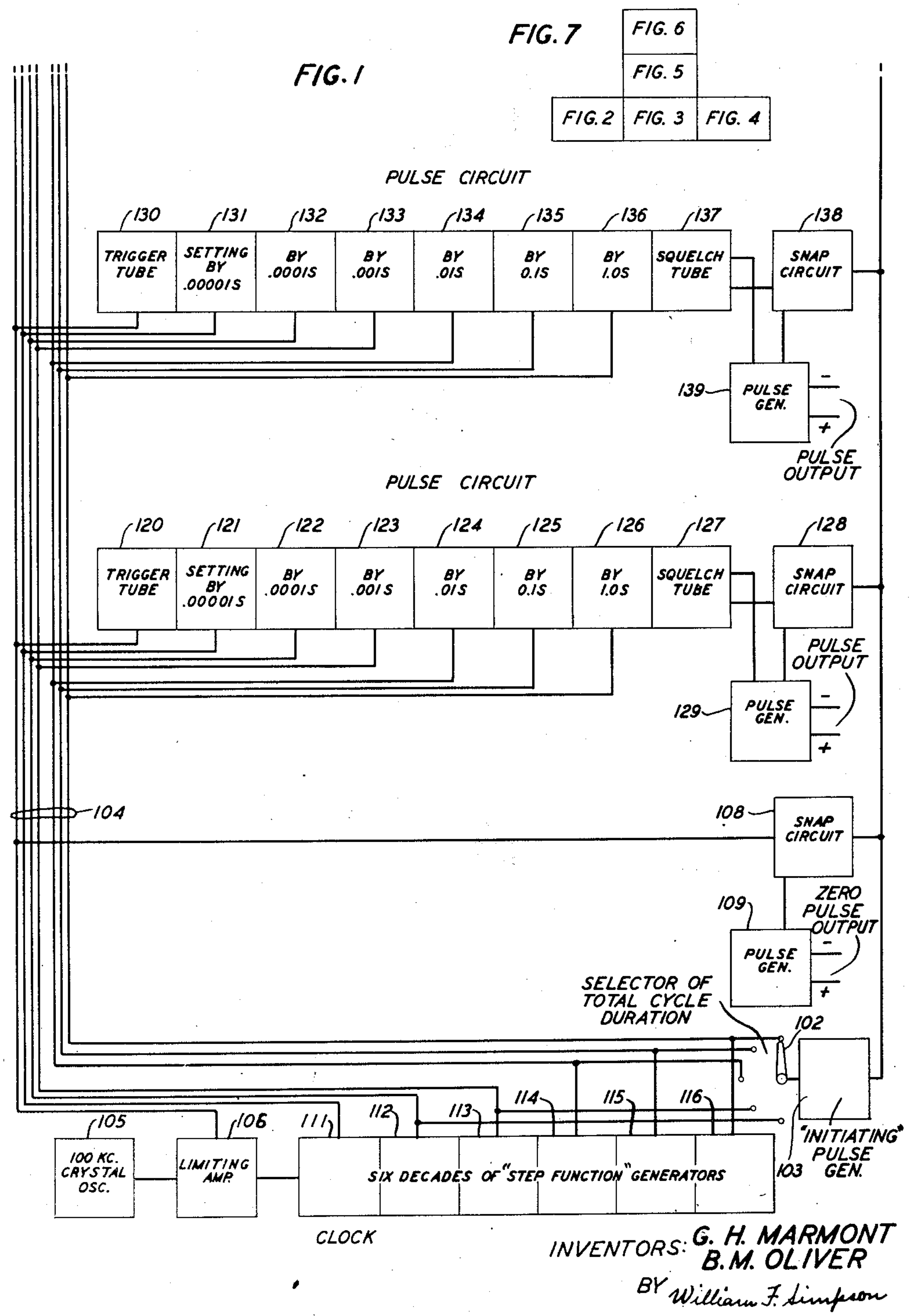

A suitable basic timing element or circuit comprises a 100-kilocycle oscillator designated 105. Inasmuch as it is desired to accurately control the timing of the various pulses it is necessary that the oscillator 105 be provided with a degree of stability equal or better than that required in the output. In general, a highly stable piezoelectric crystal oscillator will be employed. Examples of typical oscillators suitable for use in combination with the present invention are disclosed in United States Patents 1,788,533, Marrison, January 12, 1931; 1,931,873, Marrison, October 24, 1933; 2,087,326, Marrison, July 20, 1937; 2,163,402, Meacham, June 10, 1939 and 2,275,452, Meacham, March 10, 1942. Disclosures of all of the above-referred to patents are hereby made a part of the present application as if fully included herein.

The output from the crystal oscillator 105 is amplified by the limiting or "clipping" amplifier 106. Amplifier 106 may be of any suitable type such as an overloaded amplifier. The 100-kilocycle current or voltage, after being amplified by the limiting amplifier or device 106, has substantially a square or rectangular wave form.

The output of the limiting amplifier 106 is applied to the first of a set of step function or step wave generators. In the exemplary embodiment of the invention described herein six step wave generators 111 to 116 inclusive, are provided and each is arranged to produce a wave form having ten steps. At the termination of the tenth step in any one of the generators, the circuit is returned to its initial condition and the process repeated. In the exemplary system described herein, each step of the wave form from generator 111 is ten microseconds long and a complete cycle operation of the step wave generator 111 requires one hundred microseconds. The step wave generator 111 is employed to control a second step wave generator 112. This step wave generator is arranged to generate a step wave form again having ten steps each, one of which has a period ten times as long as the steps of the wave from the first step wave generator 111, i. e., one hundred microseconds. The second step wave generator controls a third and this third controls a fourth, and so on. Each of the step wave forms generated by the respective generators comprises ten steps, each step being of the same duration as a complete cycle of the step wave form generated by the preceding step wave form generator. In addition, each of the ten steps has substantially the same magnitude. After ten steps a step in the opposite direction is produced which has a magnitude equal to the sum of all the other steps. Persons skilled in the art will readily understand that the wave forms do not necessarily have to have ten steps or even the same number of steps. Neither is it necessary that the steps be of the same magnitude in the different wave forms or in the same wave form. However, by arranging the system in the manner described certain additional advantages are obtained.

The outputs of all but the first of the step wave function generators are connected to a selector switch 102 which is employed to select the rate of recurrence or the cycle of operation of the resetting apparatus which in turn controls the cycle of operation of the entire system. Switch 102 is also connected to resetting or initiating pulse generator 103 which generates a pulse for initiating or permitting the operation of the other pulse generating circuits and thus starts another cycle of operation of the system. The initiating pulse also conditions the "zero" or reference time pulse circuit so that a reference or zero time pulse will be transmitted. The "zero" time pulse circuit comprises snap circuit 108 and the pulse generator circuit 109.

The output of the step wave generators is also connected to the pulsing circuits, that is, to the circuits arranged to generate pulses having predetermined and also adjustable time relationships one with another or with a reference pulse or time. Each of the pulsing circuits comprises apparatus for selecting or controlling the time at which a pulse will be generated by that circuit. Provision has been made in each of the pulse generating circuits to enable the selection of the time at which a pulse is generated and this time is entirely independent of the time of generation of the pulses of any of the other pulse generating circuits. The circuits are designed so that the pulse may be generated at the end of any one of the ten-microsecond intervals between the reference or zero time pulse and a time as great as ten seconds later. Of course, more or fewer step wave generators may be employed in which case the pulses generated could be more accurately located or could be extended over a longer time interval.

The limiting amplifier 106 is also connected to the pulse generation circuits to time accurately the transmission of the pulses from these circuits. Provision is also made for preventing the transmission of more than one pulse from any pulse transmission circuit during any given cycle of operation of the system.

While only two pulse circuits are shown in Fig. 1, it will be readily apparent to persons skilled in the art that any suitable number of pulse circuits may be supplied from the control equipment shown in Fig. 1 by means of the conductor 104.

Assume for purposes of illustration that the switch 102 is connected to the longest step wave generator 116 so that at the end of the operation of the entire set of step wave generators an initiating pulse will be applied to the initiating pulse generating circuit 103. The initiating pulse will condition the pulse circuits due to the operation of the so-called snap circuits 108, 128 and 138.

The operation of the snap circuit 108 by the initiating pulse conditions this circuit to be reset by the first trigger pulse to occur thereafter so that a pulse is transmitted under control of this first trigger pulse after the start of the cycle. This pulse represents zero time or reference time for the ensuing cycle of operation of the pulse system. Incident to the generation of the zero time pulse, snap circuit 108 is restored to the condition in which it prevents the transmission of any further pulses from circuit 109 until another initiating pulse is received from circuit 103.

The selector switches in each one of the control units of each of the pulse generator circuits are set to an indicated time which is the desired delay of the pulse from that circuit with respect to the zero time pulse. When the respective indicated times have elapsed after the transmission of the zero time pulse, pulses are transmitted from the respective pulse generators 129 and 139. The system will then remain in that condition until another initiating pulse is applied to the snap circuits as described above. When this occurs, the above-described cycle of operations will be repeated.

As shown in Fig. 1, each of the pulse generating circuits is arranged to generate simultaneously both a positive and a negative pulse which may be utilized for independent purposes, or both pulses may be simultaneously used for the same purpose. These pulses may be used to initiate or terminate, or modify, the operation of any desired apparatus or equipment.

Figure 2:
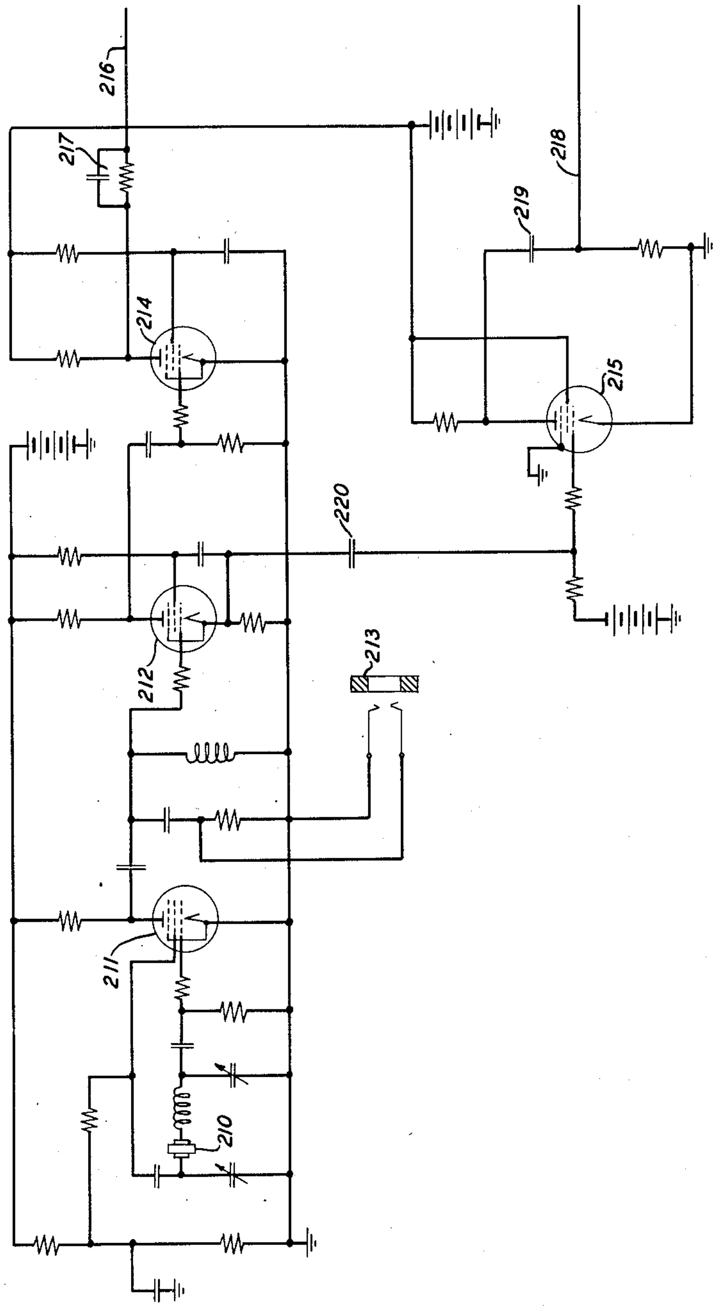
Figs. 2, 3 and 4 are to be positioned adjacent to one another
Figure 3:
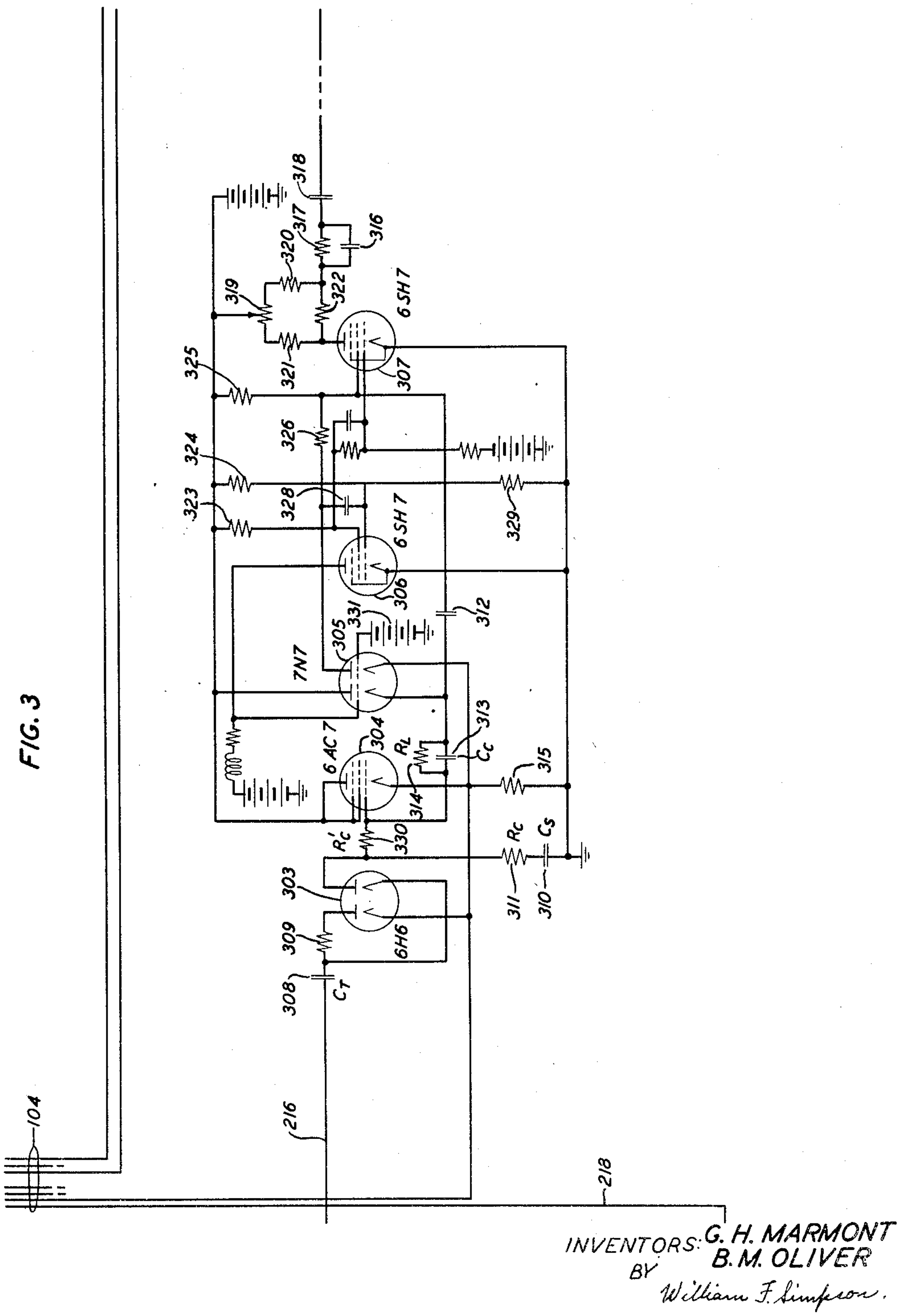

Detailed operation of an exemplary embodiment of this invention will be described with reference to Figs. 2, 3 and 4 when arranged as shown in Fig. 7. Figs. 2 and 3 show in detail the circuit arrangement and equipment required for the generation of the step wave form or function for three successive decades. The necessary vacuum tube filament or heater circuits have not been shown in the drawings. It is, of course, well understood by persons skilled in the art that suitable power is supplied to the various tubes to maintain their cathodes at a suitable operating temperature.

In addition the various anode, suppressor, screen grid, cathode potentials and other bias potentials are shown as being supplied by individual batteries. However, these potentials may be supplied from one or more rectifiers or other power supply devices. These power supply devices may also have their outputs regulated in any suitable manner as is well understood in the art.

*Common equipment and circuits*

A suitable one hundred-kilocycle crystal-controlled precision timing oscillator and related equipment is shown in Fig. 2. The oscillator tube is shown at 211 and is connected in the circuit with a piezoelectric crystal 210. Crystal 210 will usually be a quartz crystal and may be mounted in a temperature-control oven or container as is well understood by persons skilled in the art. An output jack 213 is provided for test purposes so that the frequency, wave shape, amplitude, and other information relative to the operation of the oscillator may be readily obtained.

The output of the oscillator 211 is coupled to amplifying tubes 212 and 214 arranged in tandem. These tubes are operated as limiting amplifiers so that a substantially square wave output is produced.

Figure 9:
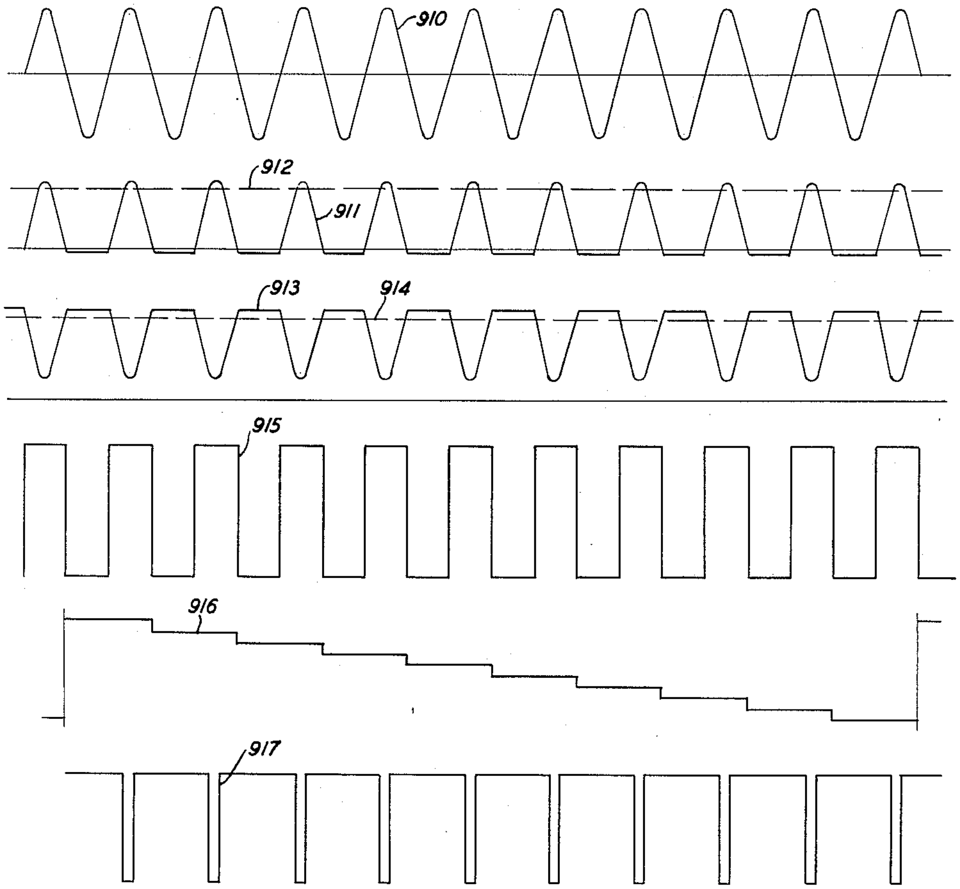

The operation of these tubes may be more readily understood by reference to graph 910 in Fig. 9 which shows the output wave form from the crystal-controlled oscillator 211. As represented by graph 910 this output wave form is substantially sinusoidal. This wave form is applied to the grid of tube 212. Tube 212 is so biased that the anode current ceases to flow through the tube during the negative half-cycle of the applied sinusoidal voltage 910. As a result the potential of the cathode of this tube is illustrated by the graph 911 while the potential variations of the anode are illustrated by the graph 913. The output of tube 212 is in turn coupled to tube 214. Tube 214 is biased so that substantially no anode current flows in its output circuit when the potential of the control grid falls below the line 914 of Fig. 9. Consequently, the anode potential at this time will be at substantially the supply voltage. When the input voltage is above line 914, tube 214 passes an appreciable amount of output current. As a result the output wave form through the coupling networks 217 will have a wave form as illustrated by graph 915.

A second output tube 215 has its input circuit connected to the cathode of tube 212. Consequently, the voltage applied to the control grid of tube 215 will have a wave form represented by graph 911. Tube 215 is provided with bias of such a value that substantially no output current flows in the anode circuit of this tube as long as the input voltage remains below line 912. As a result output pulses flow in the output circuit of tube 215 only during the time graph 911 is above the dashed line 912. As a result a series of negatives pulses of short duration are transmitted over the output lead 218 which is coupled to the output circuit of tube 215 by means of condenser 219.

The output of tube 214 is connected through network 217 and lead 216 to a "transfer" condenser $C_T$ designated 308 in Fig. 3. Transfer condenser 308 is also connected to a double diode tube 303. The right-hand terminal of the transfer condenser $C_T$ is connected to the cathode of the right-hand diode and through resistance 309 to the anode of the left-hand diode.

The anode of the right-hand diode 303 is connected to a "storage" condenser $C_S$ designated 310 in Fig. 3 through a resistance $R_C$ designated 311. A cathode follower tube 304 has its control grid connected to the anode of the right-hand diode through a resistance $R'_C$ designated 330 in Fig. 3. The cathode follower 304 is provided with the cathode resistor 315 from which the output is obtained.

As is well understood by persons skilled in the art, tubes acting as so-called "cathode follower" stages may have an extremely high input impedance and a low output impedance. Such properties as well as other properties of vacuum tubes operated as cathode followers are well known to persons skilled in the art. See the "Cathode follower" by C. E. Lockhart, parts 1, 2 and 3, published in Electronic Engineering for December 1942, February 1943 and June 1943. The foregoing publications are hereby made a part of the present application as if fully set forth herein.

Figure 8:
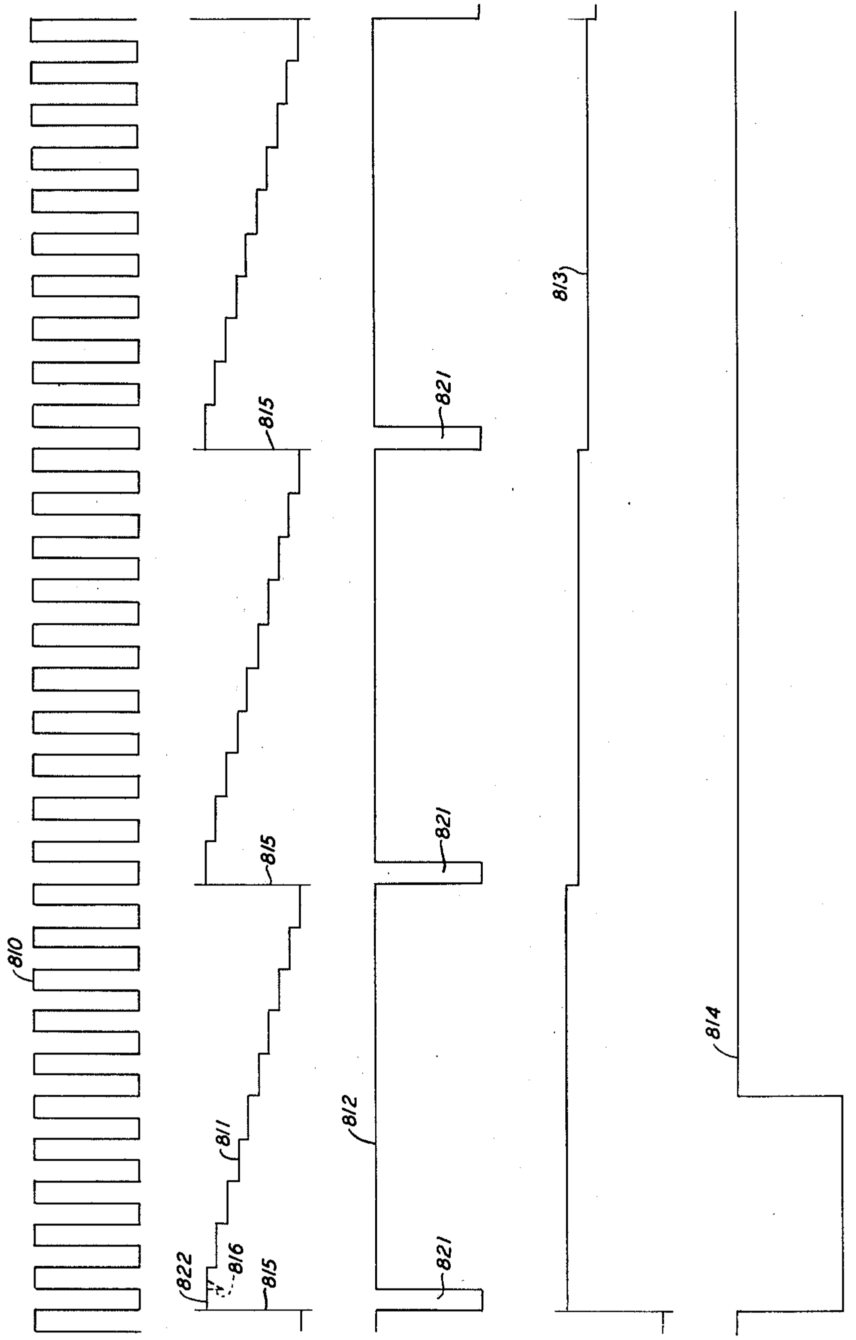
Figs. 8 and 9 show, in graphic form, the wave forms of the potentials at various places in the system.

The operation of the circuits shown in Fig. 3 may be more readily understood by reference to curves shown in Fig. 8. The broken line or curve 810 represents graphically the output wave from the limiting amplifier tube 214 as applied to the lefthand terminal of the transfer condenser 308. Each time the output of the limiting amplifier tube 214 becomes positive, transfer condenser 308 will be charged through the left-hand diode of tube 303 so that its right-hand terminal is at a potential substantially equal to the potential of the cathode of tube 304 and its left-hand terminal is at a position potential determined by the potential of the output of the amplifier tube 214. The word "potential" is usually used herein to mean the voltage relative to ground or some other reference point.

The time constant of the transfer condenser $C_T$ in conjunction with the total circuit resistance during charge is such that the charge on the condenser 308 assumes substantially its steady state value during the time that the output voltage from limiting amplifier 214 is positive.

When condenser 308 has become fully charged the cathode of the left-hand diode of tube 303 will be slightly more positive than the plate of the right-hand diode by the amount of the negative bias between the control grid and cathode of tube 304.

At a slightly later time the square wave output from tube 214 will start negative. At this time both the terminals of condenser 308 will fall in potential by the same amount until the right-hand terminal reaches a potential equal to the potential of the plate of the right-hand diode and, hence, that of the upper terminal of condenser 310. As the output square wave then continues to go more negative and reaches its final negative value, transient current will flow from ground through condenser 310, resistance 311, the right-hand diode of tube 303, transfer condenser 308, and tube 214 to ground. The total voltage causing current to flow in this circuit under these conditions will be the voltage swing or change of the output square wave form when it changes from its upper or positive value to its lower or negative value minus the grid bias voltage of tube 304. This transient current will cause a partial discharge of condenser 310 thus reducing the potential of the upper terminal of this condenser by an amount proportional to the charge removed from the condenser. The charge removed from the condenser is proportional to the magnitude of the transient current which in turn is proportional to the voltage causing this current to flow.

When the square wave again becomes positive the charge upon condenser $C_T$ will again be changed the potential of the right-hand terminal of this condenser being substantially equal to the potential of the cathode of tube 304 which is now at a lower potential by the amount of the previous discharge of condenser 310. Due to the cathode follower action of tube 304, the grid bias thereof will remain substantially unchanged and if this tube has a high mutual conductance, variations in grid bias as the storage condenser is discharged step by step will be sufficiently small to be neglected.

It is thus apparent that substantially the same voltage change is applied to the discharging circuit of condenser 310 each time the condenser is partially discharged. As a result the potential of the terminal of this condenser will fall by substantially the same amount for each complete cycle of the square wave form applied to the lead 216 and thus to the transfer condenser 308.

The graph 811, Fig. 8, shows the declining step wave form of the potential of the upper terminal of condenser 310 as a function of time. As shown by the graph 811 the potential of the upper terminal of condenser 310 will start at some positive value 822 and decrease by uniform steps, one for each cycle of the applied square wave 810. The output step wave form appears at the cathode of the cathode follower 304 and is connected to the pulse generating circuits over leads 104 as will be described hereinafter.

The cathode of tube 304 is also connected to the cathode of the right-hand section of the double triode tube 305. The grid of the right-hand section of tube 305 is connected to a source of potential 331 of such a magnitude that this section of the tube 305 is normally non-conducting. In addition to tube 305, two additional tubes 306 and 307 are provided and connected in a modified multivibrator circuit sometimes called a single stroke multivibrator circuit. This circuit is so arranged that tube 306 is normally conducting and tube 307 is not conducting. These tubes have their control grids and screens interconnected to provide the multivibrator action. Thus the control grid of tube 306 is maintained at such a positive potential by means of resistances 324 and 329 that current normally flows in the anode circuit of this tube. The grid of tube 307, however, is connected to a potential such that current normally does not flow in the anode circuit of tube 307.

As the voltage upon the upper terminal of condenser 310 is decreased, step by step, as described above, the cathode of the right-hand section of tube 305 has its potential likewise lowered. This reduces the bias on this section by successive steps. When the voltage of this cathode, and thus the grid bias, is reduced below a critical value in response to some particular step, the right-hand section of tube 305 will start to conduct current.

Tube 305 in conducting current at this time will apply a negative potential to the grid of tube 306 through condenser 328 and thus substantially interrupt the current flowing through this tube. Interruption of the current flowing through the screen circuit of tube 306 will apply a more positive potential to the control grid of tube 307 and thus cause this tube to pass current and generate a negative pulse in its anode circuit. This latter pulse is transmitted through the resistance network 319, 320, 321, 322 as well as a coupling network comprising resistance 317 and condensers 316 and 318 to a second circuit, shown in Fig. 4, similar to the circuit shown in Fig. 3. The magnitude of the pulse may be readily adjusted by the potentiometer 319, while its shape may be controlled or determined by the elements 317, 316 and 318.

When current ceases to flow through the output circuit of tube 306 in the manner described above, a more positive potential is also applied to the grid of the left-hand section of tube 305. Consequently, the left-hand section of this tube will also start to conduct current through its anode-cathode circuit. The left-hand section of tube 305 acts as a cathode follower tube and causes the condenser 310 to be recharged to a positive potential through the network comprising resistance 314, condenser 313 and resistance 330. The action of the circuits in charging condenser 310 is illustrated by the vertical line 815 of Fig. 8. The potential of the upper terminal of condenser 310 is restored to the value 822 and the above cycle of operation repeated. When the voltage of the upper terminal of condenser 310 rises, as described above, the voltage of the upper terminal of resistance 315 and also of the cathode of the right-hand section of tube 205 also rises with the result that this section of tube 305 ceases to conduct current. Tube 307, however, due to the action of tube 306 and the multivibrator, does not at once cease conducting current.

The values selected for the resistances and capacities of the multivibrator circuit, such as capacity 328, are such that tube 307 will conduct current for the time of about half of a step in that decade. Cessation of the flow of current through tube 307 will terminate the output pulse transmitted to Fig. 4 while the conduction of current by tube 306 will reduce the potential of the grid of the left-hand section of tube 305, thus blocking this tube and preventing it from further affecting this potential of the upper terminal of condenser 310 until this potential has been reduced step by step in the manner described above and the right-hand section of tube 305 again starts to conduct current.

In the exemplary embodiment of this invention described herein the constants of the circuit elements have been so chosen that the potential of the upper terminal of condenser 310 is reduced in ten steps from its most positive value 822 to its lowest value, after which it is again recharged and its potential again reduced through ten steps. The cycle of operation is then repeated and is shown by the graph 811 of Fig. 8. Inasmuch as each cycle of the hundred-kilocycle square wave is completed in ten microseconds and causes the potential of the upper terminal of condenser 310 to be reduced by one step, and inasmuch as ten steps are required for a complete cycle of operation, the time elapsing between two of the vertical lines 815, Fig. 8, will be ten times ten microseconds or one-hundred microseconds. In other words, the fundamental frequency of the wave form across resistance 315 and also across condenser 310 will be ten kilocycles. Likewise, the pulse output through condenser 318 will occur once every one-hundred microseconds. These pulses are illustrated at 821 in graph 812.

Figure 4:
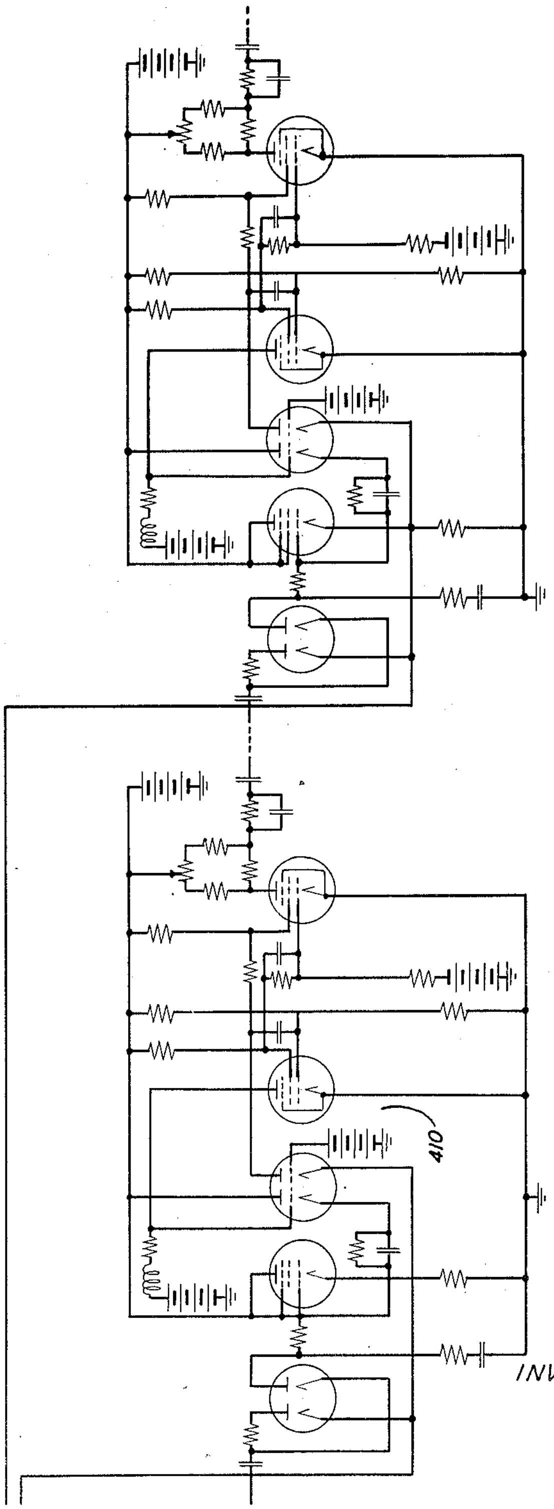

The pulses 821 are applied to a similar step wave generator 410 shown in the left-hand portion of Fig. 4. This step wave generator is so arranged that it likewise produces a wave form having ten steps. In this case, however, each step is ten times as long as the steps of the wave form produced by the equipment shown in Fig. 3. In other words, each of the steps is one-hundred microseconds long and the complete wave requires one-one thousand of a second. Graph 813 of Fig. 8 represents the first three steps of one cycle of the step wave generator 410. Graph 814 represents the wave form transmitted from the step wave generator 410 to the next step wave generator.

Figure 6:
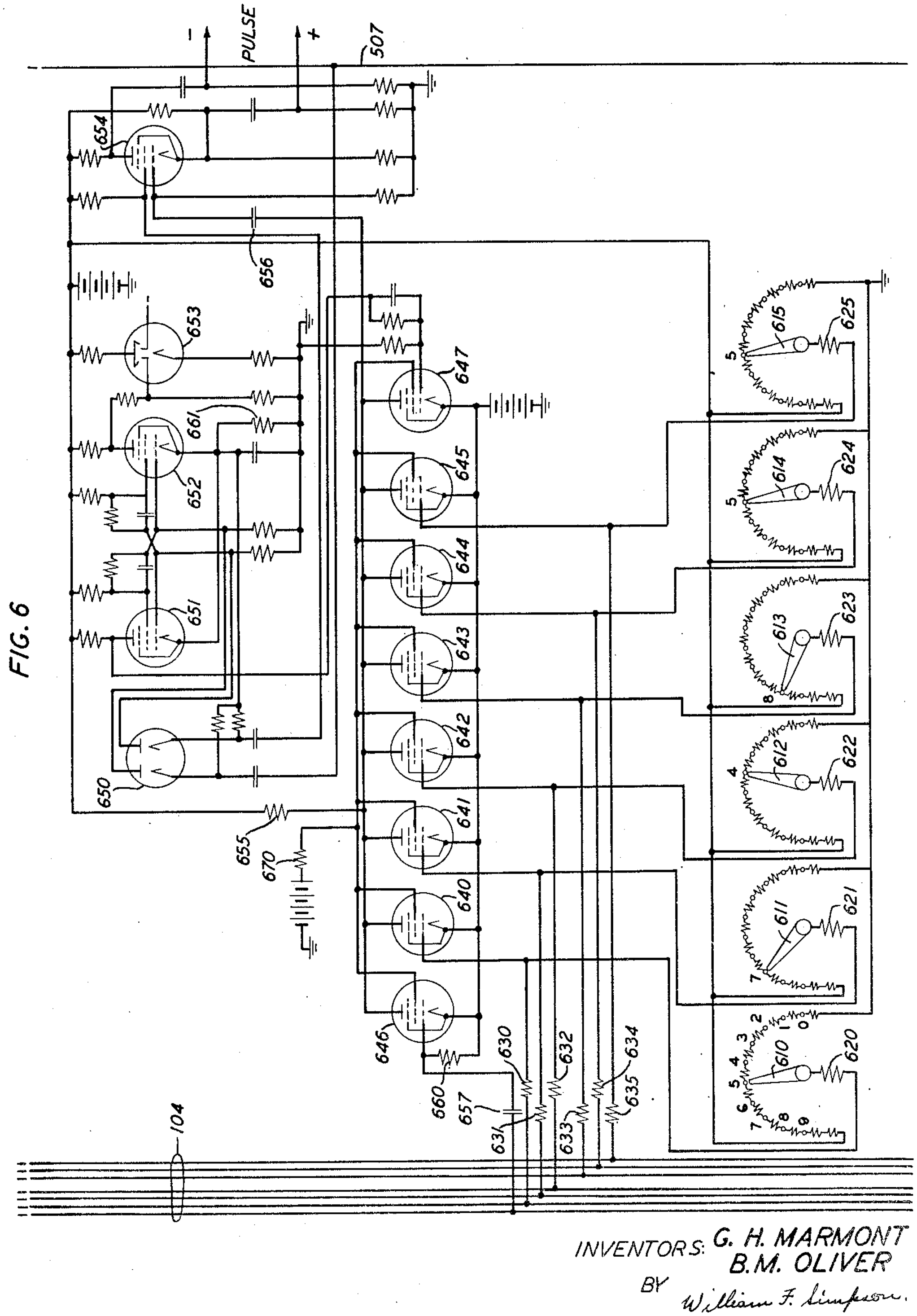

As shown in Fig. 6, six sets of equipment are provided for generating six different wave forms, each one of which has a fundamental frequency one-tenth of the fundamental frequency of the immediately preceding generator. Thus each step in the final step wave generator will be one second long and each complete wave requires ten seconds.

A further feature of the step wave form generators relates to provision of the condenser 312 connected between the screen of tube 307 and the cathode of the left-hand section of tube 305.

Condenser 312 is provided to charge the grid-cathode capacity of the left-hand section of tube 305 when this tube ceases to conduct in the middle of the first step. Without condenser 312 the capacity between the grid and cathode of the letf-hand section of tube 305 is charged through the storage condenser 310, the charging current of which flows through resistance 311 to cause a spurious pulse to appear in the output wave form which is illustrated by the line 816 in Fig. 8. However, this pulse can be substantially eliminated or neutralized by providing condenser 312 and connecting it to the screen of tube 307. Tube 307 stops conducting at this time and, hence, causes a positive pulse to be applied to condenser 312. This pulse is of the opposite polarity to the pulse 816 and by properly choosing the size of condenser 312 this pulse may substantially neutralize the spurious pulse 816 described above.

As the frequency of the step wave form becomes lower, the sizes of the transfer condenser 308 and storage condenser 310 become larger so that it may require appreciable time for charges upon these condensers to reach their steady state values. If no equalization were provided this charging time would have the effect of rounding off the corners or steps of the step wave form such as illustrated by curve 1112 of Fig. 11. Consequently, the potential for each of the steps would not reach its proper value for an appreciable interval of time during which a number of the cycles of the hundred-kilocycle wave form will be received and produce steps in the higher frequency waves. It would thus become difficult, if not impossible, to use the various step waves to secure accurate timing in the manner described hereinafter.

Figures 10, 11:
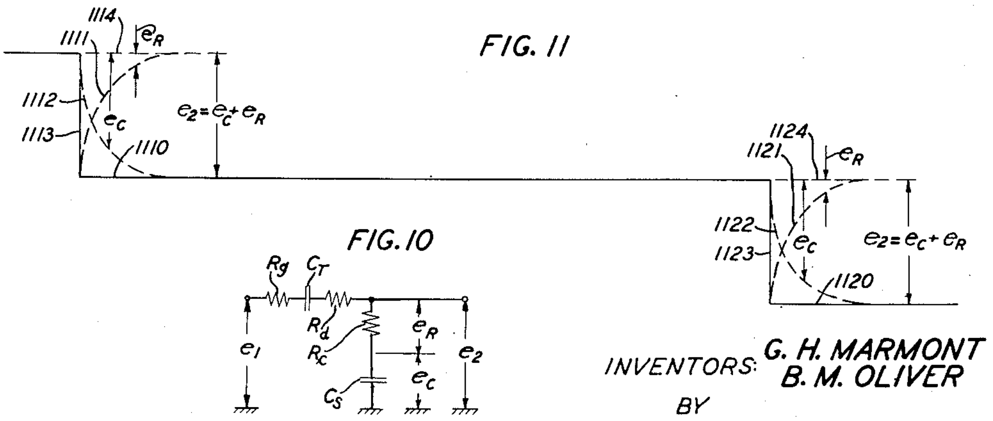
Fig. 10 shows a simplified portion of the circuits.
Fig. 11 shows the wave forms of the voltages across certain of the elements of the circuit in Fig. 10.

In order to overcome this difficulty and cause the wave forms to be substantially square, a compensating resistance Rc designated 311 in Fig. 3 is connected in series with the upper terminal of condenser Cs. The effect of this resistor may be more readily understood by reference to Figs. 10 and 11. Fig. 10 shows the discharging circuit of condenser Cs for each step.

The discharge of Cs on each step, neglecting Rc, takes place with a time constant, $$\tau=(R_g+R_d)\frac{C_TC_S}{C_T+C_S}$$

where $R_g$=internal impedance of square wave source (or of previous counter stage pulse output circuit).

$R_d$=plate resistance of diode.

Ordinarily $R_d \ll R_g$, and $R_d$ may be neglected. The expression for the transient across Cs at any discharge is then $$e_s=\Delta E_S\left(1-\epsilon-\frac{t}{\tau}\right)$$

where ΔEs is the difference in potential between a given step and the preceding step. (ΔEs is therefore negative.) In the last counter stage, for example $$C_T=0.1\ \mu\text{fd.}$$

$$C_S=2\ \mu\text{fd.}$$

$$R_g\cong 0.1\ \Omega$$

so that $$\tau\cong 0.00095\ \text{second}$$

It would thus require about 4×0.0095 or 0.038 second for the output voltage of this stage to reach substantially the final potential corresponding to the true step height.

By adding the resistance Rc and by taking the output voltage across the series combination of Rc and Cs this delay can be eliminated. In particular, if Rc is so chosen that $$R_CC_S=(R_g+R_d)CT$$

then $$Z_1=kZ_2$$

where $k$ is a pure numeric and $Z_1$ is the impedance of the transfer condenser $C_T$ and the resistance $R_g+R_d$ in series and $Z_2$ is the impedance of condenser Cs and resistance Rc in series. In this case $$e_2=e_1\frac{Z_2}{Z_1+Z_2}=e_1\frac{1}{1+k}$$

and if the input square wave has a sharp leading edge the output step will have an equally sharp edge. The voltage across the condenser Cs is given by $$e_c=\Delta E_S\left(1-\epsilon-\frac{t}{\tau'}\right)1$$

and the voltage across the resistor Rc by $$e_{R_C}=\Delta E_S\epsilon-\frac{t}{\tau'}1$$

where $\tau'$ is given by $$\tau'=(R_g+R_d+R_C)\frac{C_TC_S}{C_T+C_S}$$

The output voltage is now $$e_2=e_c+e_{R_C}$$

or simply $$e_2=\Delta E_S1$$

and with a pure step function input, is also a step function.

The only requirement on $\tau'$ now is that it be less than about one-fifth of the time during which the input to the counter is negative, so that the discharge of Cs will be substantially complete and the current through Rc substantially zero before conduction is stopped in the right diode. Thus condenser 310 still requires an appreciable time to be charged or discharged. However, the voltage across Rc due to the charging current flowing through this resistance, contributes to the total potential applied to the input circuit of the cathode follower 304 to produce a substantially rectangular wave form as shown by the step.

The action of resistance Rc in compensating for the internal resistance of tube 214 and the righ-hand diode of tube 303 is illustrated in Fig. 11. Lines 1113 and 1123 represent the vertical portions of two steps of one of the step wave forms and lines 1110 and 1120 represent the horizontal portions of the respective steps. Curves 1112 and 1122 show the manner in which the potential of the upper terminal of condenser 310 varies with time during the discharge thereof. The rate of fall of potential along curves 1112 and 1122 is a function of the internal impedance of the generator supplying the input wave, and of diode 303 as well as other factors. The potential drop across resistance 311 is illustrated by the distance between lines 1111 and 1114 for the first step and between lines 1121 and 1124 for the second step. When the voltage drop across the resistance 311 is algebraically added to the voltage across the condenser the resultant voltage is of the desired step wave form of substantially horizontal or constant steps. Thus resistance 311 compensates for the effect of the internal impedance of the generator and of tube 303 and causes the resultant wave form to be made up of a substantially constant voltage of different values with a substantially instantaneous transition from one voltage to the next. In other words when the value of the compensating resistance is chosen in accordance with the above equations and is connected as shown, the transitions from one voltage of the step wave form to the next have substantially the same shape as the transients of the square wave form generated in Fig. 2.

Resistance R'c designated 330 in Fig. 3, together with resistance 311, functions during the charging of condenser 310 in the same manner which resistance 311 functioned during a discharge of condenser 310, as described above. In other words, the voltage drop across resistances 311 and 330 is added to the voltage across the condenser 310 so that the voltage applied to the control grid of tube 304 rises substantially vertically. Condenser Cc designated 313 in Fig. 3 is connected in the charging circuit of condenser 310 in a position similar to the position of condenser 308 in the discharging circuit of condenser 310. Condenser 313 in an exemplary embodiment of the invention has a value of approximately ten times the capacity of condenser 310 and the sum of resistances Rc and R'c is about ten times the internal resistance of the cathode circuit of the left-hand section of tube 305. Resistance 314 is employed to discharge condenser 313 after condenser 310 has been fully charged and during the time condenser 310 is being discharged step by step as described above.

*Initiating pulse circuit*

Figure 5:
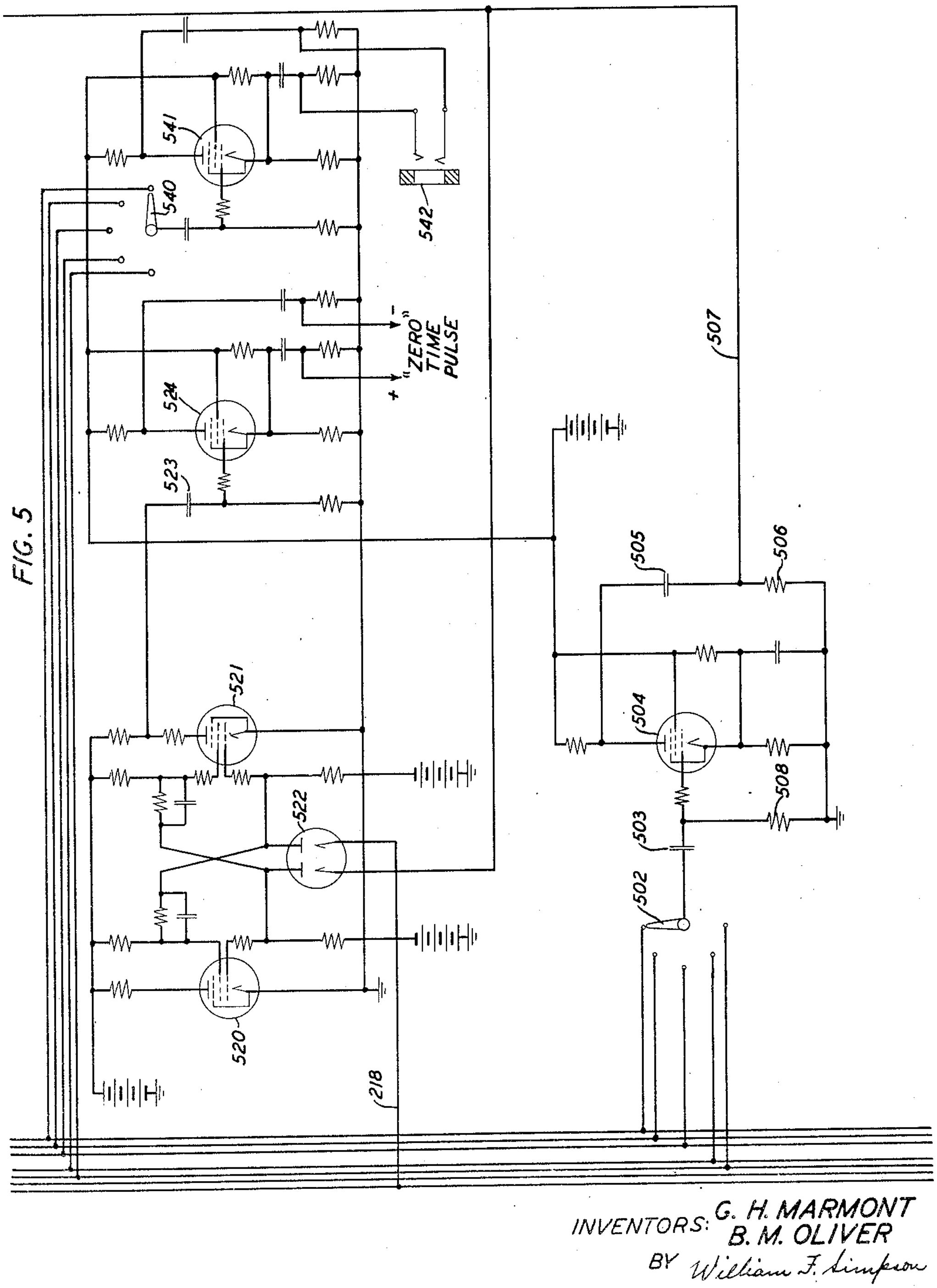

As shown in Fig. 1 and described above an initiating pulse circuit is provided for periodically resetting the pulse transmission circuits. Details of this circuit are shown in Fig. 5. This circuit is connected by switch 102 to the output of the various step wave generators as shown in Fig. 1. The same switch is designated 502 in Fig. 5. Switch 502 serves to connect the input circuit of the pulse initiating tube 504 to the output of one of the step wave generators through the coupling condenser 503.

Tube 504 is normally biased so that substantially no current flows in its anode circuit unless a positive pulse is applied to its control grid. During the time the potentials of the representative step waves are falling step by step small negative pulses will be applied to the grid of tube 504. However, inasmuch as this tube is already biased to cut-off these pulses produce substantially no effect. However, when the potential of the various step wave forms rises abruptly between the ninth and zero steps, as described above, a large positive pulse is applied to the grid of tube 504 through the coupling condenser 503. The coupling condenser 503 together with resistance 508 are of such values that they tend to take the derivative of the step wave form and thus apply a pulse of only a very short duration when the potential of the step wave form abruptly changes.

When a positive pulse is applied to the control grid of tube 504 in the manner described above current will flow in its output circuit. This current produces a potential drop across the anode resistor and causes the potential of the anode to fall very rapidly. The output of tube 504 is coupled through condenser 505 to conductor 507 which extends to the pulse generation circuits.

Switch 502 is shown connected to the lowest frequency step wave function. With switch 502 in this position an initiating pulse will be generated every ten seconds. By moving switch 502 to the other positions initiating pulses will be generated more frequently. When switch 502 is in its next position initiating pulses will be generated every second. In the next position every tenth of a second and so on.

Tube 541 likewise has its input circuit connected to switch 540 which also may be positioned to apply any of the first five step wave forms to the input circuit of this tube. Tube 541, however, is normally biased so that it will repeat the step wave forms appearing at its input circuit. The output circuit of tube 541 extends to a jack 542 to which testing apparatus such as a cathode ray oscilloscope, voltmeters, and other equipment may be connected to observe the shape of the step wave forms and aid in the maintenance of the system.

*"Zero" time pulse circuit*

The circuits of the zero time pulse equipment shown in Fig. 1 and described above are shown in detail in Fig. 5. Tube 522 comprises an isolating tube circuit while tubes 520 and 521 comprise a so-called snap circuit and tube 524 serves as a zero time pulse generator.

Assume for purposes of illustration that current is flowing in the output circuits of tube 520 and that no current is flowing in the output circuits of tube 521. Tube 524 has bias applied to it such that substantially no current flows in its output circuit under these conditions.

Upon the application of the initiating pulse to the circuit from the initiating pulse generator over lead 507 current will flow through the left-hand diode of tube 522 and thus reduce the grid potential of tube 520 sufficiently to interrupt the current flowing in both the anode and screen circuits of this tube. Due to the multivibrator action between tubes 520 and 521, tube 521 will start to conduct current at this time. Tube 521 in conducting current at this time will cause a potential drop across its anode resistor and thus reduce its plate potential. This reduction of plate potential causes a negative pulse to be applied to the grid of tube 524 through the coupling condenser 523. Inasmuch as tube 524 is biased to cut-off at this time application of the further negative pulse to its grid circuit produces substantially no effect.

As described above the initiating pulse is generated when the selected one of the step wave forms rises from its lowest value to its most positive value. This occurs at one of the times when the square wave form from the limiting amplifier tube 214 changes from its high positive value to its negative or last positive value. At about seven at that particular instant of time the last one of the conducting tubes will become non-conducting so that none of the tubes will be conducting thereafter until some one of the step wave forms is again restored to its initial or zero potential.

Tube 646, however, is still conducting until the negative trigger pulse is applied to its control grid through the coupling condenser 657 under control of the hundred-kilocycle oscillator shown in Fig. 2.

Upon application of the negative timing or trigger pulse to the control grid of tube 646, tube 646 will cease to conduct current. Thus, tube 646 is the last one of tubes 640 through 647 to become non-conducting. At this time current ceases to flow through the common anode resistor 655 so that a positive potential is applied to the control grid of tube 654. The condition of conduction of the various tubes 640 through 647 described above, and which is continually changing, produces little or no effect so long as any one of these tubes is conducting. However, when the last one ceases to conduct as described above high positive potential is applied to the control grid of tube 654 to cause current to flow in the output circuit of this tube.

A step wave form 916 has been shown in Fig. 9 in proper time relationship to the second wave form 915 received from the limiting amplifier tube and also to the timing and trigger pulse 917. As described above, the step wave forms change when the square wave output from tube 214 changes from a positive to negative or less positive value. However, the timing or trigger pulses 917 occur during the middle portion of the time when this output wave form is positive. In other words, approximately seven to seven and one-half microseconds after the square wave form changes from its upper to its lower value. During this seven and one-half microsecond period the various circuits have ample time to reach their steady state value and tubes 640 through 645 to become conducting or non-conducting in response thereto so that by the time the trigger or timing pulse is transmitted the various circuits and tubes will be in their proper condition for accurately transmitting the pulse.

It should also be noted that pulses 917 occurs at accurately spaced intervals of ten microseconds. Consequently, the pulse output from the circuit shown in Fig. 6 will be accurately spaced an integral number of ten microseconds after the transmission of the zero time pulse by the circuits shown in Fig. 5 and described above. The number of ten-microsecond intervals between the zero pulse and the pulse output from the circuits shown in Fig. 6 is likewise accurately determined by the setting of switches or potentiometers 610 through 615 as described herein.

Tube 654 in becoming conducting will cause a negative pulse to be applied to the cathode of the right-hand section of tube 650. This negative pulse will overcome the positive bias due to the cathode resistor 661 and cause the potential of the grid of tube 651 to be reduced in value so that tube 651 will cease to conduct current.

Tube 651 in ceasing to conduct current through its anode circuit causes a positive potential to be applied to the control grid of tube 647 which tube thereupon starts to conduct current. The current flowing through tube 647 will cause a potential drop across the common anode resistor 655 which in turn applies a negative pulse to the control grid of tube 654 through the coupling condenser 656 and thus terminates the output pulse applied by this tube to the output circuit.

Tube 651 in becoming conducting causes tube 652 to become non-conducting. Thereafter tube 651 continues to conduct current and tube 652 remains non-conducting until another initiating pulse is applied to the cathode of the left-hand section of tube 650 in the manner described above. Inasmuch as tube 651 remains conducting tube 647 will also remain conducting. Consequently, no further pulses will be applied to the control grid of tube 654 until after the pulse generating circuit is reset by an initiating pulse.

Tube 652 in becoming conducting applies a negative potential to the control element of the indicator tube 653 thus indicating that a pulse has been transmitted from the pulse generating circuit.

It is thus apparent that by appropriately setting the potentiometers 610 to 615, a pulse may be transmitted from the pulse generating circuit shown in Fig. 6, once every ten seconds at the end any number of ten-microsecond intervals of time after the "zero" time pulse. For example, with potentiometers set in positions shown in Fig. 6 the pulse will be transmitted 5.58475 seconds after the "zero" time pulse. In other words, potentiometer 615 controls the number of seconds after the "zero" time pulse while potentiometer 614 controls the number of tenths of seconds which is added to the number of seconds. In a similar manner each of the succeeding potentiometers controls the next digit of the time interval after which the pulse will be transmitted.

It is further apparent that the setting of the potentiometers for each pulse generating circuit is independent of the setting of the potentiometers in any of the other pulse generating circuits. In order to prevent interaction between the potentiometers of the various pulse generating circuits connected to the leads 104, the values of the resistances 630 through 635, 620 through 625, as well as the magnitude of resistances corresponding to resistance 315 of the step wave generator and the current capacity of tube 304 must be properly selected. It will be, of course, obvious to persons skilled in the art that, if necessary or desirable, several tubes similar to 304 may be operated in parallel to provide additional power for controlling other pulse generating circuits.

It is thus possible to set one of the pulse generating circuits to transmit a pulse at the same time as the zero time pulse or shortly thereafter and to adjust other of the pulse generation or transmission circuits for the transmission of pulses at any desired interval of time later in steps of ten microseconds. These pulses may be employed to initiate, to alter, or to terminate the operation of any suitable apparatus.

As described above, tubes 640 to 646 are continually changing from a conducting to a non-conducting condition in accordance with the potentials of the step wave forms applied to their control grids and the settings of the corresponding potentiometers 610 to 615. As indicated above, these tubes are so adjusted that their conducting or non-conducting condition does not materially affect the current flowing in the common anode resistor 655 except when the final tube ceases to conduct. However, the conducting and non-conducting condition of these tubes does alter the screen grid current flowing through them and microseconds later, as described above, a negative timing pulse is transmitted from tube 215 over lead 218. This pulse is applied to the cathode of the right-hand section of tube 522 where it causes the potential of the grid of tube 521 to be reduced sufficiently to interrupt the current flowing in the anode and screen circuits of this tube. Upon the interruption of the current flowing in the screen circuit of tube 521 current starts to flow in the anode and screen circuits of tube 520 and continues to flow until another initiating pulse is received in the manner described above.

The interruption of current flowing in the anode circuit of tube 521 at this time causes a positive pulse to be applied to the grid of tube 524 through coupling condenser 523. Application of a positive pulse to tube 524 will cause current to flow in the anode circuit of tube 524 and thus cause positive pulses to be generated in the cathode circuit of tube 524 and a negative pulse in the anode circuit of this tube. These pulses serve as zero timing pulses. As indicated above, this zero timing pulse is accurately controlled by the limiting amplifier tube 215 which in turn is actively controlled from the crystal oscillator tube 211 in the manner described above.

Thus each time an initiating pulse is applied to the left-hand cathode of tube 522 a zero time pulse will be transmitted by tube 524 substantially seven microseconds later, the time of which is accurately controlled by the timing pulse applied to conductor 218 by tube 215.

*Pulse generation circuit*

Only a single pulse generation circuit is shown in Fig. 6. However, it will be readily apparent to persons skilled in the art, as many additional circuits in accordance with Fig. 6 may be connected to the conductors 104, 218 and 507 as may be desired. If a large number of pulse generating circuits are required it may be necessary or desirable to apply repeating equipment for repeating the step wave form to various circuits.

For purposes of explaining the behavior of the circuit shown in Fig. 6, assume that tube 651 is not conducting current when tube 652 has current flowing in both its anode and screen circuits. Under these conditions current will also be flowing in the anode circuit of tube 647 because a positive potential will be applied to its grid from the anode of tube 651.

The application of a negative initiating pulse to the cathode of the left-hand section of tube 650 reduces the positive potential applied thereto by the cathode resistor for tubes 651 and 652, and reduces the potential of the grid of tube 652 and thus causes this tube to cease conducting current, if it has previously been conducting current. If the tube was not previously conducting current, the pulse applied to the cathode of the left-hand section of tube 650 will produce no effect.

When tube 652 ceases to pass current through its anode circuit as described above, tube 651 will become conducting due to the positive pulse being applied to its control grid from the screen of tube 652. When tube 652 becomes non-conducting it also applies the positive pulse to the control element of indicator tube 653 thus indicating that the pulse generating circuit shown in Fig. 6 has been conditioned for the transmission of a pulse. Tube 651 in becoming conducting causes a negative potential to be applied to the grid of tube 647 and thus causes tube 647 to become non-conducting if it had previously been conducting.

Tubes 640 through 646 inclusive are normally biased so that they will be conducting and thus cause a large potential drop across their common anode resistance 655 which in turn tends to cause a negative or low positive potential to be applied to the lower terminal of the coupling condenser 656. Tube 654 is biased so that it is normally non-conducting except when a positive pulse is applied to its control grid through the coupling condenser 656, at which time a positive pulse is applied from its cathode to the positive output lead and a negative pulse is applied to the negative output lead from the anode of tube 654.

The biasing potentials applied to the control grids of tubes 640 through 645 are obtained from the series of potentiometers 610 to 615, inclusive. Each of these potentiometers is provided with ten different positions for applying ten different biases to the respective grids of the corresponding tubes.

The various wave forms generated by the step wave generators as described above are also applied to the respective coupling resistances 630 to 635 to the control grids of tubes 640 through 645. The cathode potential of these tubes is such that, with the low potential applied from the respective potentiometers 610 through 615 when they are set in their "zero" positions, the respective tubes will not conduct current even when the most positive value of the step wave forms is applied through the respective coupling resistances 630 to 635.

However, if the potentiometers are set in a higher position as, for example, positions 1 through 9, then the corresponding tubes will conduct current until the potential of the step wave form has fallen to the corresponding steps at which time the respective tubes 640 to 645 cease to conduct current. Thus, for example, if the first potentiometer 610 is set in its No. 5 position as shown in the drawing, then tube 640 will continue to conduct current so long as the potential of the step wave form applied to its control grid through the coupling resistance 430 is above the potential of the No. 5 step. When the step wave form has a potential of or below the No. 5 step, tube 640 will not conduct current. Similarly, with the potentiometer 611 set at the No. 7 position as shown in the drawing, tube 641 will continue to conduct current so long as the step function generated by the second step wave generator which is shown in the left-hand half of Fig. 4, has a potential greater than the No. 7 step thereof. After the potential of the wave form has fallen to and below the No. 7 step, tube 641 will cease to conduct current. When the wave form returns to its No. 0 step, however, tube 641 will again conduct current. In a similar manner each of the succeeding tubes conducts current so long as the corresponding wave form has a potential above the step corresponding to the position of the respective potentiometer.

It is thus apparent that one or more of the tubes 640 through 645 will be conducting current until the step wave forms from all of the step wave generators are simultaneously at the steps corresponding to the positions of each of the potentiometers. At this time all of the tubes 640 through 645 will simultaneously be non-conducting. The tubes 640 through 645 may not simultaneously become non-conducting but thus tends to affect the screen potential applied to them.

In order to reduce the total necessary current for the tubes 640 to 647 and also in an effort to improve the operation of the circuits, resistance 670 is connected in series with the screens of these tubes. Consequently, when a large number of tubes are passing screen current the screen potential will be relatively low so that the screen current passed by each of them will also be low. This resistance therefore tends to reduce the total screen current required by all of the tubes. Also with a large number of these tubes passing screen current and their screens therefore at a lower positive potential the anode circuits of the tube will have a relatively higher impedance with the result that the changes in current through the anode resistor 655 are less when the respective tubes change conduction, so long as one or more of them remains conducting, than if the screen resistor 670 were not present.

It is also possible to generate pulses at more frequent intervals than every ten seconds by changing the position of switch 502. If this switch is set in its No. 2 position then the pulses will be transmitted from each of the pulse circuits every second instead of every ten seconds, because an initiating pulse will be received every second. Under these conditions, however, it is necessary that the potentiometer associated with the longest step wave form be set in its zero position. Otherwise, pulses may not be transmitted from the corresponding pulse circuit during each interval. If the switch 502 is set in its No. 3 position then potentiometers 614 and 615 will each have to be set in its zero position if it is desired to have a pulse transmitted from the pulse transmission circuit for each initiating pulse applied thereto.

If the potentiometers associated with the longer step wave forms are set in positions other than the zero position they will determine which ones of the initiating pulses will allow a later pulse to be transmitted by the pulse generating circuits.

Persons skilled in the art will understand that this invention is not limited to the specific tubes, apparatus or circuit arrangements shown and described in the exemplary system embodying this invention and that other types of tube may be employed in the same or different circuit arrangements in accordance with this invention.

What is claimed is:

1. In a timing circuit, a wave generator comprising a charge storage condenser, a charge transfer condenser, a source of voltage having at least two different values of voltage each of which is maintained relatively constant for an appreciable interval of time, apparatus for effectively connecting said condensers to said source during the change from one of said voltage values to the other thereof, apparatus for compensating for the internal impedance of said source and said connecting means comprising an impedance element connected in series with said storage condenser and having such a value that the sum of the impedances of said storage condenser and of said impedance element is equal to a constant multiplied by the sum of the impedance of said transfer condenser, the impedance of said source, and the impedance of said connecting means, and a utilization circuit connected across said storage condenser and said impedance element.

2. In a timing circuit, a charge storage condenser having an initial charge, a charge transfer condenser, a source of voltage which abruptly changes from one voltage value to another, apparatus for connecting said condensers to said source during said abrupt voltage change to remove a charge from said storage condenser, a compensating impedance connected in series with said storage condenser for compensating for the internal impedance of said voltage source, an output circuit connected across said condenser and said compensating impedance for obtaining voltage changes which vary abruptly in the same manner as the abrupt changes of said voltage source, other equipment for abruptly recharging said storage condenser, other compensating equipment connected in series with said storage condenser during said recharging of said storage condenser for compensating for the internal impedance of said recharging equipment.

3. In a timing circuit, a charge storage condenser having an initial charge, a charge transfer condenser, a source of voltage which abruptly changes from one voltage value to another, apparatus for connecting said condensers to said source during said abrupt voltage change, a compensating impedance connected in series with said storage condenser for compensating for the internal impedance of said voltage source, an output circuit connected across said condenser and compensating impedance for obtaining voltage changes which vary abruptly in the same manner as the abrupt changes of said voltage source, other equipment for abruptly restoring the voltage across said storage condenser, other compensating equipment connected in series with said storage condenser during said abrupt restoration of the charge on said storage condenser for compensating for the internal impedance of said restoring means, apparatus controlled by the potential upon said storage condenser for controlling the potentials applied to said transfer condenser.

4. In a step wave generator a source of electrical potential, a charge storage condenser, a charge transfer condenser for changing the charge on said storage condenser, means for charging said transfer condenser from said source, a control circuit responsive to the potential of said storage condenser and connecting said charge storage condenser to said charge transfer condenser for controlling the potentials applied to said transfer condenser to cause substantially the same change in the charge on said storage condenser each time the charge on said condenser is changed, and apparatus comprising an impedance connected in series between said source of potential and said charge storage condenser and of such value as to compensate for the internal impedance of the source of potential.

GEORGE H. MARMONT.
BERNARD M. OLIVER.

REFERENCES CITED

The following references are of record in the file of this patent:

UNITED STATES PATENTS

| Number | Name | Date |
|---|---|---|
| 2,113,011 | White | Apr. 5, 1938 |
| 2,141,343 | Campbell | Dec. 27, 1938 |
| 2,413,440 | Farrington | Dec. 31, 1946 |
| 2,415,567 | Schoenfeld | Feb. 11, 1947 |

FOREIGN PATENTS

| Number | Country | Date |
|---|---|---|
| 566,200 | Great Britain | Dec. 19, 1944 |